United States Patent
Blotnik et al.

(10) Patent No.: US 11,305,935 B2
(45) Date of Patent: Apr. 19, 2022

(54) ROBOTIC WAREHOUSE

(71) Applicant: GET FABRIC LTD., Tel Aviv (IL)

(72) Inventors: Guy Blotnik, Tel Aviv (IL); Ori Avraham, Kfar Saba (IL); Leav Oz Ari, Haifa (IL); Yuval Regev, Rehovot (IL); Shmuel Ur, Shorashim (IL)

(73) Assignee: GET FABRIC LTD., Tel Aviv-Jaffa (IL)

( * ) Notice: Subject to any disclaimer, the term of this patent is extended or adjusted under 35 U.S.C. 154(b) by 0 days.

(21) Appl. No.: 17/132,149

(22) Filed: Dec. 23, 2020

(65) Prior Publication Data

US 2021/0188547 A1 Jun. 24, 2021

Related U.S. Application Data

(60) Provisional application No. 62/952,640, filed on Dec. 23, 2019.

(51) Int. Cl.
*B65G 1/137* (2006.01)
*B65G 1/04* (2006.01)

(52) U.S. Cl.
CPC ......... *B65G 1/0492* (2013.01); *B65G 1/1378* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,008,827 | B1* | 4/2015 | Dwarakanath | F25B 27/00 700/214 |
| 9,665,095 | B1* | 5/2017 | Romano | B25J 9/0096 |
| 10,315,231 | B1* | 6/2019 | Brazeau | B07C 5/38 |
| 10,392,190 | B1* | 8/2019 | Theobald | B25J 9/161 |
| 10,954,067 | B1* | 3/2021 | Theobald | B25J 19/022 |
| 2018/0215539 | A1* | 8/2018 | Kimura | G05D 1/0274 |
| 2020/0167727 | A1* | 5/2020 | Ikeda | G06Q 10/087 |
| 2020/0310463 | A1* | 10/2020 | Ben | G05D 1/0212 |
| 2021/0089046 | A1* | 3/2021 | Xu | G01B 11/026 |

* cited by examiner

*Primary Examiner* — Kyle O Logan
(74) *Attorney, Agent, or Firm* — Myers Wolin, LLC

(57) ABSTRACT

A storage facility having lift robots and ground robots cooperating in transferring of totes within the facility, is disclosed. The transferring of totes between ground robots and lift robots in the facility through buffer locations, allows the totes to be carried on top of the lift robots, which are thereby secured against unintentional dropping of the tote. The efficiency of the storage facility may be further improved in that the buffer locations, and in various embodiments also short height storage locations, which are accessible directly to ground robots, are utilized for storing totes that are ranked as associated with high prevalence to be transferred by ground robots, without the involvement of lift robots.

16 Claims, 8 Drawing Sheets

ROBOTIC WAREHOUSE

CROSS-REFERENCE TO RELATED APPLICATION

This application claims the benefit of provisional patent application No. 62/952,640 filed Dec. 23, 2019, titled "LR & GR Decoupling", which is hereby incorporated by reference in its entirety without giving rise to disavowment.

TECHNICAL FIELD

The present disclosure relates to the field of robotic inventory handling.

BACKGROUND

U.S. Patent Application 2017/0267452, titled "Robotic Inventory Handling", which is hereby incorporated in reference in its entirety for all purposes without giving rise to disavowment, describes an architecture comprising the following components: Lift Robots, Ground Robots, shelve units, totes and picking stations. When it is desired to bring a tote to the picking station, a Lift Robot would take the tote from the shelving unit, rendezvous with a Ground Robot located on ground level, and transfer the tote to the Ground Robot. The Ground Robot would then carry the tote to the picking station. The process is performable in a reverse order, e.g. when a tote is to be returned from a picking station to the shelving unit.

BRIEF SUMMARY

One exemplary embodiment according to the presently disclosed subject matter, is a storage facility comprising: a plurality of shelving units each comprising a plurality of storage levels differing from one another by height from above a floor of the storage facility; a first plurality of robotic carriers configured to carry deliverables (in the context of the presently disclosed subject matter, a deliverable is an object intended to be transferred by robotic carriers between locations in the storage facility) between the plurality of storage levels; a second plurality of robotic carriers configured to carry deliverables between low-level locations leveled no more than a predetermined height above the floor of the storage facility, wherein storage locations within a predetermined number of storage levels from above the low-level locations, are beyond the reach of robotic carriers from said second plurality; a picking station; a computerized mission planning center configured to control transfer of deliverables between locations in the storage facility, by the first plurality and the second plurality of the robotic-carriers; wherein robotic carriers of the first plurality are of simplified structure in that each robotic carrier from said first plurality is configured to carry deliverables situated on the robotic carrier from above on a horizontally maintained platform, the robotic carrier being thereby secured against unintentional dropping of the tote; and wherein the mission planning center is configured to provide for a transfer of a tote of interest from the top of a robotic carrier of the first plurality to a robotic carrier of the second plurality, or from a robotic carrier of the second plurality to the top of a robotic carrier of the first plurality, by first instructing a robotic carrier which already carries the tote of interest, to unload the tote onto an intermediating platform accessible to a robotic carrier of the second plurality, and upon unload approval, instructing a robotic carrier intended to receive the tote, to upload the tote of interest from the intermediating platform.

In various embodiments of the presently disclosed subject matter, the intermediating platform comprises at least one location for receiving a deliverable, each such location is provided with stoppers for stopping a deliverable from continuing to comove with a robotic carrier, when the robotic carrier maneuvers for unloading a deliverable of interest by moving through the intermediating platform.

In various embodiments of the presently disclosed subject matter, each robotic carrier of the second plurality comprises a tote dragging element configured to drag a tote of interest onto or from the intermediating platform when the robotic carrier maneuvers for unloading or uploading a deliverable of interest by moving through the intermediating platform.

In various embodiments of the presently disclosed subject matter, the stoppers are retractable.

In various embodiments of the presently disclosed subject matter, the dragging element is retractable.

While the storage facility and its various embodiments is a first aspect of the presently disclosed subject matter, another aspect of the presently disclosed subject matter is a method for handling robotically operated deliveries of deliverables, between locations within a storage facility, the storage facility comprises a floor level, a plurality of storage levels differing in their respective height from above the floor level, the method comprising: identifying a first plurality of robotic carriers as being capable of carrying deliverables between the plurality of storage levels; identifying a second plurality of robotic carriers as being capable of carrying deliverables between low-level locations leveled no more than a predetermined height above the floor level, wherein storage locations within a predetermined number of storage levels from above the low-level locations, are beyond the reach of robotic carriers from said second plurality; providing locations at which deliverables can be directly accessible by carriers of the second plurality; sorting and memorizing lists of deliverables ranked according to expected prevalence of participation of the deliverables in deliveries between locations directly accessible to carriers from the second plurality; and utilizing said sorting for storing in the low-level locations, deliverables ranked as associated with high prevalence of participation in deliveries between locations directly accessible to robotic carriers from the second plurality.

In various embodiments of the method according to the presently disclosed subject matter, the method is further comprising instructing a robotic carrier from the second plurality of robotic carriers to transfer a deliverable of interest from a deliverables-receiving-station directly to a storage location without intermediation of robotic carriers from the first plurality, whenever the deliverable of interest is ranked as associated with high prevalence of participation in deliveries between locations at the reach of robotic carriers from the second plurality, and there is a free storage location in the low-level locations, for receiving the deliverable of interest.

In various embodiments, the method may further comprise activating a robotic carrier from the first plurality of robotic carriers, to free a storage location located in the low-level locations, for receiving the deliverable of interest, said activating is based on said sorting in that a deliverable currently stored in a storage location to be freed is ranked as associated with lower prevalence of participation in deliveries between locations at the reach of robotic carriers from the second plurality, than a ranking of the deliverable of interest.

In various embodiments, the method may further comprise submitting robotic carriers from the first plurality of robotic carriers, during time durations at which there are no other missions to be fulfilled by, to missions involved with increasing the number of deliverables more highly ranked for their prevalence of participation in deliveries between locations directly accessible by robotic carriers from the second plurality, in said directly accessible locations.

In various embodiments of the method according to the presently disclosed subject matter, the locations directly accessible by robotic carriers of the second plurality includes at least one of; (i) storage locations leveled no more than a predetermined height above the floor level and accessible by robotic carriers of the first plurality; (ii) storage locations leveled no more than a predetermined height above the floor level and inaccessible by robotic carriers of the first plurality; (iii) buffer stations accessible by robotic carriers of the first plurality; (iv) deliverables-receiving-station; and (v) deliverables-picking-station.

In various embodiments of the method according to the presently disclosed subject matter, it further comprises provision of uniformly sized totes as the deliverables.

In various embodiments of the method according to the presently disclosed subject matter, the method further comprises arranging a plurality of different goods within a range of totes, said arranging includes sorting and memorizing lists of inventory items ranked according to expected prevalence of participation of the inventory items, respectively, in deliveries between locations directly accessible to carriers from the second plurality, wherein said arranging is based on said sorting, in that different inventory items within each specific tote from the range are ranked all within a respective predetermined ranking extent, differing to robotic carriers from the second plurality, is a function of a ranking of inventory items accommodated by each deliverable.

In various embodiments of the method according to the presently disclosed subject matter, the method further comprises utilizing a self-learning algorithm for updating the prevalence of participation per a deliverable, based on actual participation of the deliverables, in deliveries between locations directly accessible to carriers from the second plurality. In various embodiments of the method according to the presently disclosed subject matter, the ranking of deliverables according to expected prevalence of participation of the deliverables in deliveries between locations directly accessible to carriers from the second plurality, may be performed by a human. As an example human ranking may be used either as a preparation step and by providing human ranking to the system as input, or on regular basis (e.g. whenever a human worker considers it appropriate to intervene in a previously presented ranking). In various embodiments of the method according to the presently disclosed subject matter, human intervention in the ranking, may be followed by a self-learning algorithm updating the prevalence of participation per a deliverable, based on actual participation of the deliverables, in deliveries between locations directly accessible to carriers from the second plurality. In various embodiments of the method according to the presently disclosed subject matter, the method may include a human intervention in the ranking, the human intervention defined at least in that one or more types of deliverables are excluded from intervention of the self-learning algorithm in determining and/or updating their ranking.

In various embodiments of the method according to the presently disclosed subject matter, the method comprises removal of least-recently interacted totes, from at least one buffer unit in the storage facility, and moving the least-recently interacted totes for storage in the shelving units, as a means for freeing storage locations in the at least one buffer unit, for totes returning from the picking station, and or for totes arriving from the inventory receiving station.

In various embodiments of the method according to the presently disclosed subject matter, the method further comprises utilizing a self-learning algorithm for updating the prevalence of participation per each inventory item, based on actual participation of the inventory item, in orders placed by customers.

In various embodiments of the method according to the presently disclosed subject matter, the method further comprises directing a robotic-carrier from the second plurality, to a location where it may become loaded with a deliverable of interest by removing the deliverable of interest from the location onto the robotic-carrier while the robotic-carrier is in motion.

In various embodiments of the method according to the presently disclosed subject matter, the method further comprises directing a robotic-carrier from the second plurality, to a location where it may become unloaded from a deliverable of interest by moving through the location without stopping.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
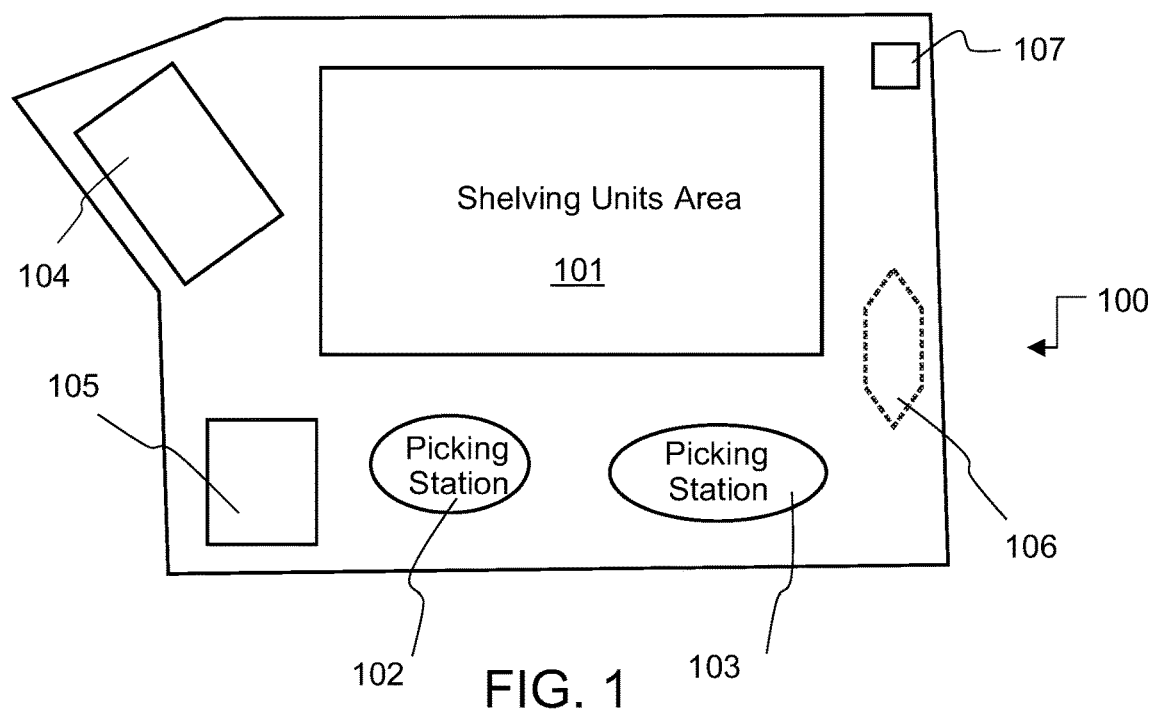
FIG. 1 illustrates a top view of an embodiment of a storage facility according to the presently disclosed subject matter.

In sake of simplicity only, the presently disclosed technology will be described in context of a robotic warehouse retaining food items. It is noted, and accordingly claimed using broader scope terms, that the presently disclosed subject matter can be utilized in a wide variety of configurations of robotically managed warehouses.

In the context of the presently disclosed subject matter, the following terms are used:

Lift Robot (abbreviated LR)—a robot constituting a robotic-carrier configured to move deliverables at least in the vertical direction, thus being capable of moving a deliverable of interest between the maximal height (from above the floor level) at which deliverables of interest may be stored and a predetermined minimal height.

Ground Robot (abbreviated GR)—a robot constituting a robotic-carrier configured to move deliverables while traveling on the floor of a storage facility, in any desired direction. A ground robot can follow a path, which can be delineated and/or referred to as continuum of distances measured with respect to a point of reference on an orthogonal X-Y axes system associated with the floor plane.

Picking Station—Picking station is a location from which prepared deliverables are outputted from the storage facility to be delivered to an external destination. The process of outputting a prepared deliverable from the Picking Station, may include consolidation of inventory items from a plurality of deliverables into a deliverable to be outputted, according to an order list. The deliverable to be outputted may be referred to as an order tote.

Shelving unit—a construction of shelves in which deliverables are stored.

Tote—a deliverable from a range of deliverables, and which may accommodate a plurality of inventory items. The tote may be uniform in at least some of the dimensions, such as depth, height, or width. In some cases, the tote may differ in some of the dimensions such as width, height, or depth. As an example, in one embodiment, all totes may have identical height, width and depth measurements, while in another embodiment, there may be a variety of different tote dimensions (h1×w1×d1, h2×w2×d2, h3×w3×d3, etc.).

In an exemplifying embodiment of a robotically managed warehouse according to the presently disclosed subject matter, the products which constitute inventory items to be marketed, are accommodated in a plurality of totes.

US Patent Application 2017/0267452, titled "Robotic Inventory Handling", and International Publication WO2018/154573, titled "VERSATILE SHELVING ARRAY", are both incorporated herein by reference in their entirety for all purposes and without giving rise to disavowment In some exemplary embodiments, robots move the totes from storage locations to the picking station and back. In a robotic warehouse, there are many shelving units. In some exemplary embodiments, between the shelving units there are corridors. In the shelving units, totes are stored. In the corridors lift robots that move in Z and X direction can take totes down to the floor where they will be taken by ground robots and taken to the picking stations (or from).

In US Patent Application 2017/0267452, an architecture with the following components is described: LR, GR, shelve units, totes and picking stations. In international Publication WO2018/154573 a variety of shelving architectures are described. According to these documents, more than one robot is required for the accomplishment of every tote transferring between a shelving unit and the picking station. When it is desired to transfer a tote from a shelving unit to the picking station, a LR would take the tote from the shelving unit, rendezvous with a GR located on the floor level, and transfer the tote to the GR. The GR would then carry the tote to the picking station. This process is reversed when it is desired to return a tote from the picking station to the shelving unit. One drawback associated with these processes is that for transferring the tote the LR and the GR need to meet, i.e. brought to the same location for being present there at a predetermined moment of time for a given time duration during which the tote may be transferred from one robot to the other. The need in arranging and having such a meeting per every transfer of a tote, consumes computational resources and reduces the efficiency of robot performance, due to waste of operative robot time. Operative robot time is wasted due to accumulating robot idle times which are inevitably spent by first robots approaching the meeting locations, in the wait for the approaching of the second robots as required for having the scheduled meetings and for passing the totes (handshake) between them.

The computational constraints involved with the scheduling of meetings burdens the missions planning task not only due to lack of flexibility in the handling of each individual robot, but also due to mutual influence between the ground robot system and the lift robot system, each as whole. Since these systems are highly "chained" by the mutual dependency between individual robots from both, any mishaps or bottleneck event experienced by the GR platform affects the LR platform and vice versa, hence damaging the efficiency of the entire facility.

One solution according to the presently disclosed subject matter, for reducing the dependency between the GR and the LR systems, is the provision of at least one buffer unit in at least one location within the storage facility. The buffer unit according to the presently disclosed subject matter, is an intermediation platform with which the LR and GR systems may interact, for passing totes between them without directly interacting.

The buffer location according to the presently disclosed subject matter, may be a construction directly accessible to both Ground Robots and Lift Robots for transferring a deliverable, e.g. a tote between a robot and the construction. It is noted that in some embodiments, the buffer location may be a predetermined location on the ground itself.

By the provision of a buffer unit, mission planning of both platforms is at least partially decoupled, in a manner that reduces the influence of events in the one system (platform) on the operation of the other. Platforms idle time in waiting one to a response from the other, may be eliminated with a proper design of the buffer size, and of the number of robots in each of the systems, based on the estimated rate of tote transferring between the systems, and on the estimated total labor load on each of the systems.

Another solution according to the presently disclosed subject matter, for reducing the dependency between the GR and the LR systems, is the provision of Short-height Storage Units that provide storage locations directly accessible to ground robots, for loading a GR with a tote from the storage location without intermediation of a LR, and for unloading a tote from a GR into the storage location without intermediation of a LR.

In various embodiments according to the presently disclosed subject matter, Buffer Units may be utilized as low-level storage locations. In such embodiments, the difference between a Buffer Unit and a Short-height Storage Unit is in that a Buffer Unit is provided with accessibility to Lift Robots, while a Short-height Storage Unit is accessible uniquely to Ground Robots.

Providing Ground Robots with the ability to reach some of the totes in the warehouse without the assistance of the Lift Robots can be valuable since the expenses involved in the possession and maintenance of a Ground Robot may be smaller than in the possession and maintenance of a Lift Robot. Short-height Storage Units may thus allow for cost-effectively decreasing the number of Lift Robots (or the ratio between the number of Lift Robots and the number of Ground Robots) in the warehouse.

A warehouse with enhanced architecture according to the presently disclosed subject matter may include a plurality of Buffer Units, region in each Buffer Unit at which a deliverable, e.g. a tote, may be unloaded from robotic carriers (e.g. LR and GR). There are multiple ways in which the LR and GR can pass a deliverable between them taking advantage of the intermediation of a buffer unit reachable by both the LR and the GR. The presently disclosed architecture thus dispenses with the requirement that GR and LR must be in the same place at the same time for transferring a deliverable between them. Moreover, the presently disclosed architecture can be utilized advantageously, based on differences between deliverables (e.g. totes). Totes in a warehouse may differ in the sorts of inventory items accommodated by, or in combinations of types of inventory items accommodated by. Such differences in the contents of totes may result with differences in the rate of occurrence of a transferring process which each tote is involved with over predetermined time periods. A control system of the warehouse may thus be configured to sort and memorize lists of deliverables (e.g. totes) ranked according to expected prevalence of participation of the deliverables in deliveries between locations directly accessible to robotic carriers from the Ground Robots group of robots. The system may, accordingly, be further configured for making use of such ranking in determining the storage locations of the deliverables in the warehouse. According to various embodiments of the presently disclosed subject matter, totes which are most frequently transferred (due to their inventory item/s content), are preferably directed by the system for a storage in a location that can be accessed by GRs directly, thereby dispensing with the involvement of LR when they are required at the Picking Station. It is noted that in some embodiments, LR may be expensive in comparison to GR, and they are thus a resource that should be used with care. In various such embodiments, extra space may be available or affordable for the warehouse while extra number of LR is unaffordable. The extra space can be used for placing Short-height Storage Units providing for low-level storage locations that are reachable by GR, hence reducing the overall requirement of LR resources in the environment.

The enhanced architecture in the various embodiments according to the presently disclosed subject matter may better warehouse throughput as the LR and GR do not need to wait for each other.

Once a tote if interest has been placed by a LR in a location accessible to GRs, the LR does not have to wait for a GR anymore, and may start working on a next assignment.

As may be appreciated, when a Buffer Unit is used, robots (both LR and GR) can work independently, thus increasing their throughput.

Full height shelving units may be expensive at least due to their inevitable association with the activity of LRs. In some exemplary embodiments, full height shelving units may require specific topography of the room. The result of this factor is that full sized shelving units may not fit into some empty regions of a warehouse. Since Buffer Units and short-height storage units are more simple to handle and less expensive than Shelving Units, in various embodiments of warehouses according to the presently disclosed subject matter, Buffer Units may be utilized for the sole use of GRs, on empty regions of the warehouse which for any reason are considered inappropriate either for erecting full height Shelving Units, or for the operation of LRs.

Referring to FIG. 1, a top overview of a warehouse 100 having Buffer Units 104 and 105 according to the presently disclosed subject matter, is illustrated. The Buffer Units 104 and 105 are located in places considered inappropriate for placing Shelving Units. The Shelving Units are more effectively distributed in the shelving units area 101. The warehouse 100, is further comprising Picking Stations 102 and 103, and a computerized Mission Planning Center 107 (which may be referred to herein also 'Mission Planning Unit'), in accordance with the presently disclosed subject matter. In various embodiments according to the presently disclosed subject matter, a storage facility, e.g. Warehouse 100, may include also an Inventory Receiving Station 106, in which goods are received from a source external to the storage facility, and from which are distributed by the robotic carriers, for being stored in the storage facility.

In some exemplary embodiments, buffer units may assist in providing a solution for fast moving of deliverables within the warehouse. Since GR according to the presently disclosed subject matter are capable of self-loading of totes directly from buffer units, it may be significantly faster to deliver a tote in either direction between a buffer unit and a picking station, than delivering a similar tote between a shelving unit and the picking station. The method according to the presently disclosed subject matter may include, accordingly, storing inventory items which are defined as requiring fast moving in buffers units, in short-height storage units or in storage locations which are directly accessible to GRs. This may enable the warehouse to function properly and yield a desired throughput, based on smaller number of LRs.

It may be appreciated that while the number of inventory items which are defined as requiring fast moving may not necessarily be large, the related types inventory items may participate in large number of the transactions. For example, in a warehouse storing food items, eggs, milk and bread may be defined as requiring fast moving since on statistical basis, they are included in almost every transaction.

Buffer units can be implemented in multiple ways. In some exemplary embodiments, the buffer units may be implemented as on shelf buffers and as standalone buffers.

Mission planning in a warehouse according to the presently disclosed subject matter, may be performed by a mission planning unit operable e.g. on a central computer, a server, a cloud-based server, or the like. It is noted that in FIG. 1, Mission Planning Unit 107 is depicted on-premise, however, it may be located remotely, such as implemented using cloud-technology. Mission planning may be performed using software algorithms executed by hardware devices. The mission planning unit may generate tasks for GRs and LRs and transmit the tasks to the robots for execution. The mission planning unit may be configured to track execution of each task to determine when a next task can be sent to the robot. In some exemplary embodiments, the mission planning unit may decide whether to utilize a GR only for storing a tote, or, alternatively, to utilize a cooperation between a GR and an LR. The mission planning unit may select a buffer unit to be used to store the tote. Additionally, or alternatively, the mission planning unit may determine whether to generate a new task for an LR to move the tote from the buffer to a different storage location, e.g. in a shelving unit.

The determination may be based on parameters such as but not limited to (i) the number of unoccupied locations in buffer units; (ii) the type of goods in tote (e.g. whether or not defined as requiring fast moving, or e.g. their ranking in terms of their prevalence of participation in deliveries between locations directly accessible to GRs); (iii) the number of available LRs, or the like. In the context of the present disclosure the term "deliverables" includes also empty totes. In various embodiments according to the presently disclosed subject matter, empty totes (e.g. totes returned by GRs from the picking stations without any content or new totes to be used in the system that are provided thereto) may be ranked as requiring fast moving, since they may be very often required either in picking stations for being used as order totes, or in inventory receiving stations for being filled with goods to be stored in the storage facility.

In some exemplary embodiments, the mission planning unit may generate the task for the LR in a later time, such as when the number of unoccupied locations in buffers units reaches a minimal threshold, or when an LR is free and does not have a preferred task to perform, or the like.

In some exemplary embodiments, the selection of the buffer unit to which a tote will be moved, may be based on the probability that the tote would later on be moved to a storage location within a shelving unit. In case the probability is below a predetermined threshold, the buffer unit to be selected, may be a standalone buffer unit. In case the probability is above the threshold, the buffer unit to be selected, may be a buffer unit located in a shelving unit that is associated with an LR, which may later on move the tote, if needed.

In some exemplary embodiments, the control system of the warehouse may utilize a self-learning algorithm for updating the prevalence of participation in deliveries between locations directly accessible by GRs, per each deliverable, per each inventory item, based on actual participation of the deliverables, in deliveries between locations directly accessible to GRs, a combination thereof, or the like.

Figure 2:
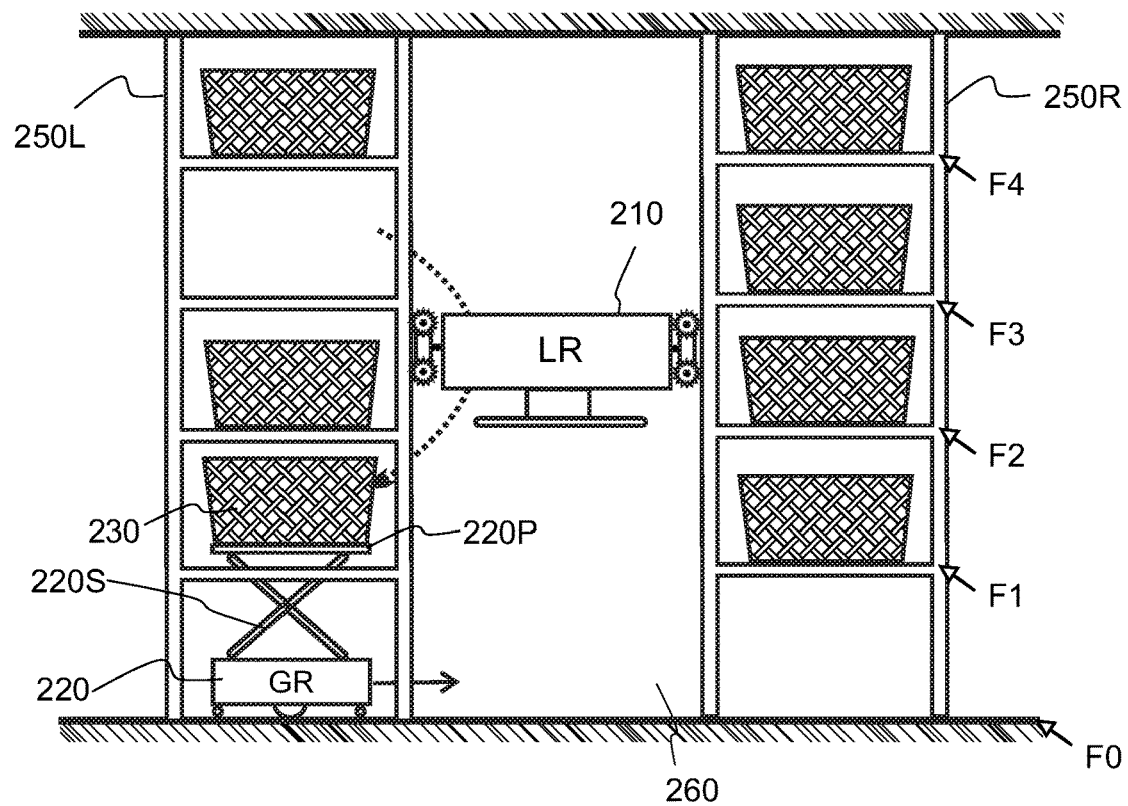
FIG. 2 illustrated utilization a side view of a region within a storage facility according to the presently disclosed subject matter, in which storage locations within shelving units are utilized as buffer units.

In various embodiments according to the presently disclosed subject matter, the first floor (lower storage level) in each Shelving Unit, or a portion thereof, may serve as a Buffer Unit. FIG. 2 illustrates an embodiment of Shelving Units according to the presently disclosed subject matter, having in a first floor thereof, F1, locations that are accessible to GRs 220. In such embodiments, an LR 210 may transfer totes 230 between the first floor F1 and all the other Shelving Unit floors, e.g. F2, F3, F4. Accordingly, no changes are required in the structure of LRs in the system, neither in the construction of the Shelving Units, apart from adaptations that may be required for enabling accessibility of GRs to the first floor in its capacity as a Buffer Unit. GR 220, is configure to upload a tote from the first floor F1, by means of scissor lift 220S, and to travel with the tote carried on the top plate 220p of the GR, in the direction indicated by the arrow, into the aisle 260.

In various embodiments of the presently disclosed subject matter, GRs are equipped with means for reaching at, and exchanging totes (or any other relevant deliverables) with locations leveled as the first floor of the Shelving Units.

Such means may include a scissor lift such as 220S, a telescopic lift or any other desired mechanism which makes the GR capable of self-loading and self-unloading of deliverable from/to standalone Buffer Units and/or first floor shelves of Shelving Units, in their role as Buffer Units, all without the assistance of LRs. Any relevant deliverables, e.g. totes, which were self-loaded by GRs and delivered to the Picking Station, may thus be returned by GRs to their initial location in the Buffer Unit, after completion of the picking cycle at the Picking Station.

Figure 3A:
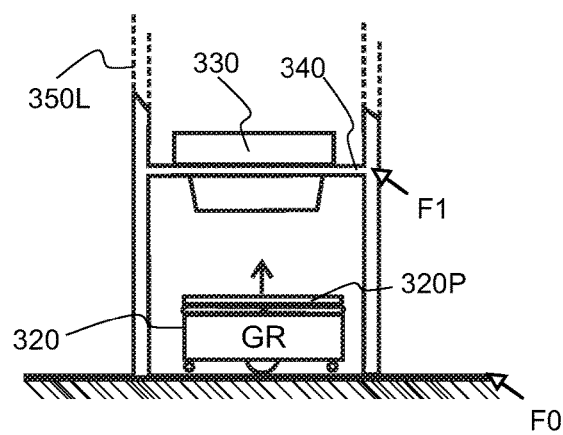
FIGS. 3a-3i illustrate in schematic side views, some steps in the process of transferring a tote of interest between locations in an embodiment of a storage facility according to the presently disclosed subject matter.
Figure 3B:
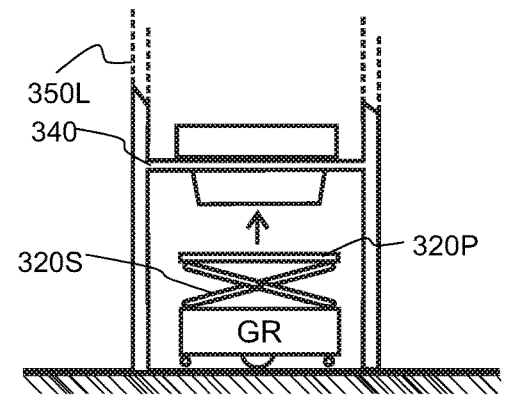
Figure 3C:
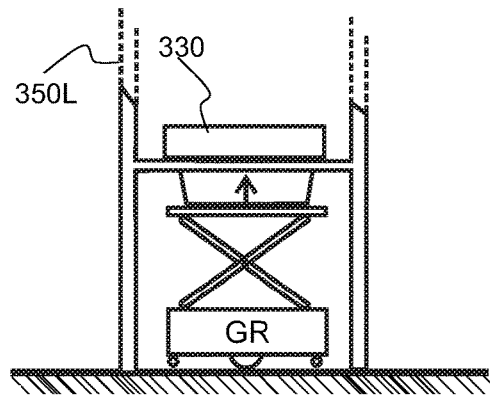
Figure 3D:
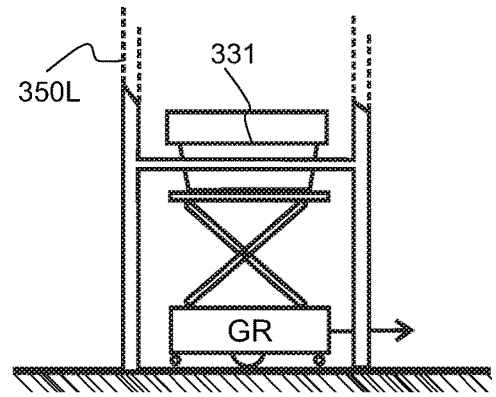
Figure 3E:
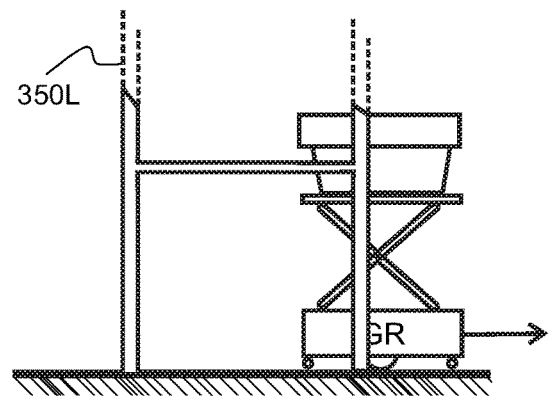
Figure 3F:
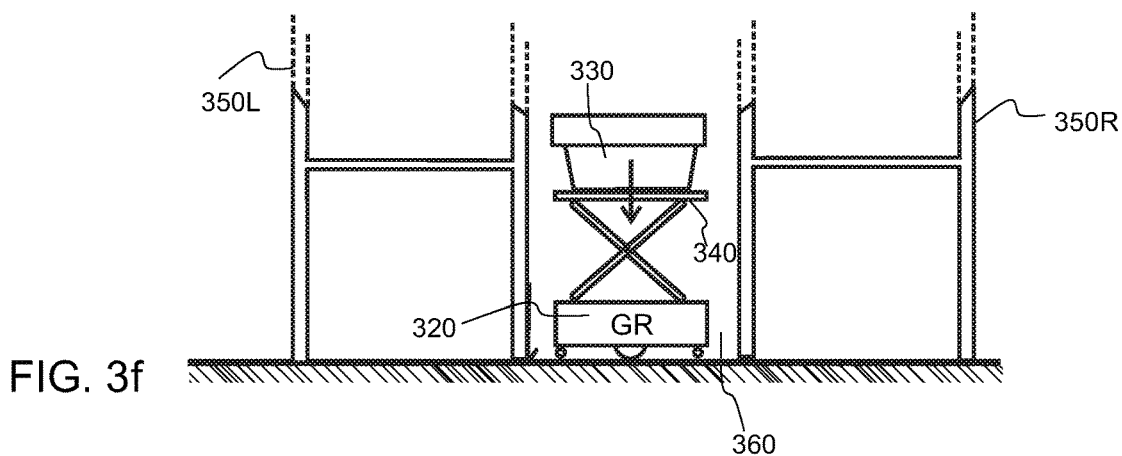
Figure 3G:
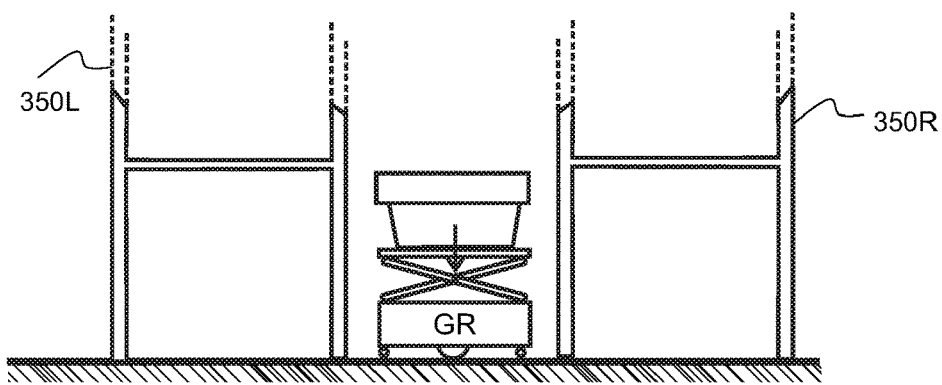
Figure 3H:
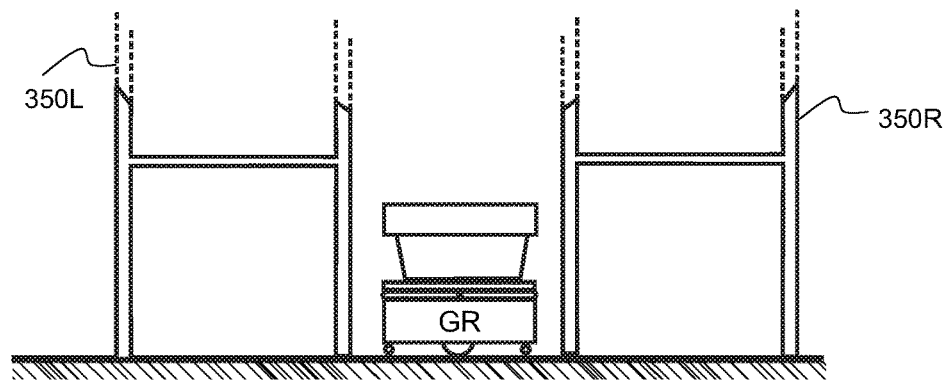
Figure 3I:
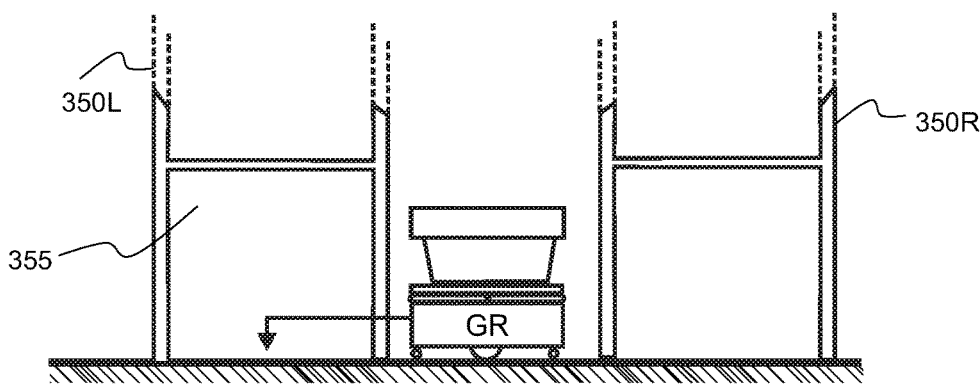

Referring now to FIGS. 3a-3i, the process performed by a GR when interacting with the Buffer Unit is illustrated. FIGS. 3a-3i illustrate a lower portion of a Shelving Unit 350L. Said lower portion includes the first floor F1, of the Shelving Unit, which is utilized as a Buffer Unit 340. Referring to FIG. 3a, a tote of interest 330, awaits already on Buffer Unit 340, for being transferred by a GR to the Picking Station. A GR 220 is shown in position, on the floor level F0 of the storage facility, under the tote of interest 330. In FIG. 3b, the GR is illustrated with its scissor lift mechanism 320S extending upwardly as indicated by the illustrated arrow. In FIG. 3c a top plate of the scissor mechanism is shown in contact with a bottom of the tote of interest 330. In FIG. 3d, the tote 330 is shown in an elevated position, with its support rim 331 from above the shoulder support 340 of the Buffer Unit. The tote is thus physically disconnected from Buffer Unit 340, and is supported only by the Scissors Lift 320S of GR 220. GR 220 may thus start to move with the tote on top of it, into the aisle to the right, as indicated by the illustrated arrow. FIG. 3e illustrates the GR 220 with the tote loaded, halfway into the aisle. In FIG. 3f, the GR 320 is shown in the middle of the aisle 360, between the mirroring Shelving Units 350L and 350R. In this position, the tote may be lowered by the scissors lift mechanism as illustrated by FIG. 3g, until a full retraction of the scissor mechanism as shown in FIG. 3h. With full retraction of scissor mechanism, the GR with the tote on top of it, are suited for normal motion and may exit the shelving units even passing through the space 355 under the Buffer Unit 340 (FIG. 3i), for then speeding up toward the picking location.

In various embodiments of the presently disclosed subject matter, a warehouse may include Simplified LRs configured to exchange totes with storage locations within the shelving units, regardless of the height of the storage locations from above the floor of the warehouse, yet unconfigured to exchange totes with GRs. In such embodiments, the GRs and the buffer units (or the first-floor shelves which constitute buffer units within the shelving units) may be mutually adapted to allow GRs exchange deliverables with the buffer units without receiving external assist.

This option enables LRs to receive totes on their tops, without requiring the LRs to lower the totes when unloading. It is noted that in embodiments which require an LR to exchange a tote directly with the GR, moving the tote in the vertical direction onto or from the top of the GR, may be required. In such embodiments LRs may therefor require inclusion of a mechanism capable of lowering and lifting a tote from/to the LR.

Providing LRs with means for carrying totes attached to the bottoms of the LRs may allow LRs to exchange totes with GRs without requiring a mechanism for moving the tote in the vertical direction. This solution is complicated, however, in that it requires exceptionally reliable failsafe mechanism, for avoiding unintentional tote dropping.

Simplified LRs, which are simple because they do not require such mechanisms, may be less expensive to manufacture and maintain, thereby may improve the financial performances of warehouses which make use of such simplified LRs, based on the incorporation of buffer units according to the presently disclosed subject matter. In some exemplary embodiments, warehouses may be implemented using heterogeneous LRs, some of which may be simplified LRs, while others may not be simplified LRs.

Figure 4:
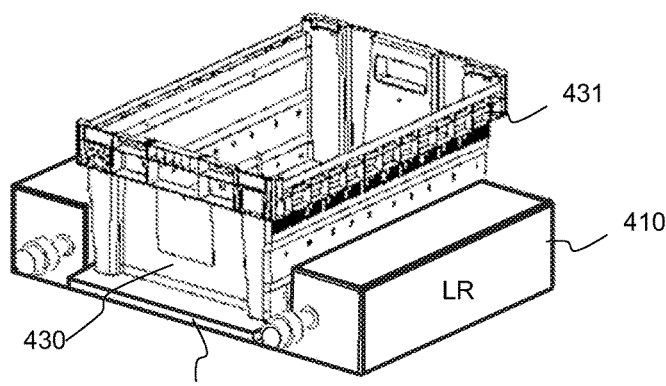
FIG. 4 illustrates in a perspective view a tote situated from above a simplified lift robot according to the presently disclosed subject matter.

In various embodiments in which Simplified LRs according to the presently disclosed subject matter are used, the transferring of a tote to and from an LR may be performed only in the horizontal direction—from and to storage locations in a shelving unit and/or in a buffer unit. FIG. 4, illustrates an exemplifying embodiment of a Simplified LR 410 in accordance with the presently disclosed subject matter. The LR 410 is shown carrying a tote 430, the tote is situated from above, on top of the support plate 410T.

Figure 5A:
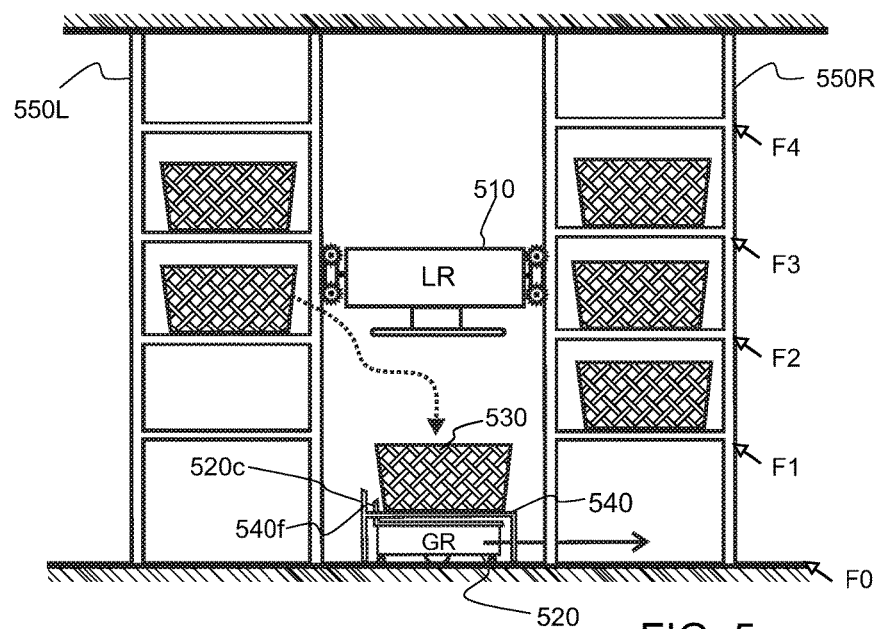
FIGS. 5a and 5b illustrate in schematic side views, two situations from the process of tote transferring in an embodiment of a storage facility according to the presently disclosed subject matter.
Figure 5B:
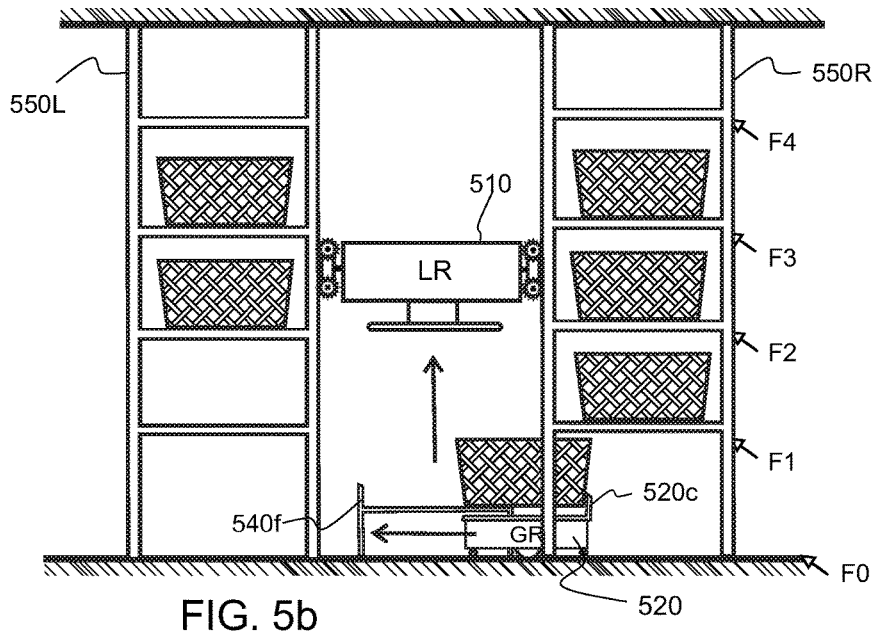

In various embodiments according to the presently disclosed subject matter, and as exemplified by FIGS. 5a and 5b, a stage 540 constituting a Buffer Unit, may be mounted on the floor of the warehouse, in a location accessible to LRs, 510, e.g. an aisle 560 separating between two Shelving Units 550L and 550R. Buffer units and GRs may be mutually configured to allow GRs to pass through or underneath a buffer unit without interacting with the buffer unit. Accordingly, stage 540 may be configured such that a GR 520 can pass underneath without interacting with the stage. The GR 520 may have a collector 520c, arrangement for uploading a tote from the stage onto the GR, and for unloading a tote from the GR to the stage. As appreciable from FIGS. 5a and 5b, the collector 520c is located at a back end of the GR, for supporting a back end of a tote to be loaded or unloaded. Accordingly, since the Buffer Unit 540 comprises flaps 540f on its left end, it is required that the GR will approach the Buffer Unit from right to left as exemplified by FIG. 5b, in case a tote of interest is to be transferred from the GR 520 to the Buffer Unit 540. The tote will then comove with the GR through the Buffer Unit 540 from right to left as indicated by the arrow. However, while the GR can freely move through the buffer unit, the tote 530 will be stopped once arriving at the flaps 540f. Thus the tote will be transferred from the GR to the Buffer Unit on the fly, i.e. while the GR keeps moving. In case a tote is to be transferred from the Buffer Unit 540 to the GR, it is required that the GR will approach the Buffer Unit 540 from left to right, as illustrated by FIG. 5a. In such case, the Collector 520c of the GR, will drag the tote by pushing the tote from its back end, towards the direction of motion, the tote and the GR will thus comove, thereby uploading the tote on top of the GR while in motion. Exchanging totes between the Buffer Unit 540 and storage locations within the shelving units, is a mission to be carried by the LR 510. As may be appreciated, no handshaking required between the LR 510 and the GR 520 from transferring totes between the shelving units and a picking station.

In various embodiments according to the presently disclosed subject matter, the Collector Arrangement 520c is passive, e.g. immovable with respect to the GR, or e.g. being responsive to forces exerted on it, by altering its position on the GR in response to the exerted forces. In other various embodiments according to the presently disclosed subject matter, the collector arrangement is active, in that it may change its position in response to instructions. Instructions may be obtained automatically from an external source such as a computerized mission planning center, or from internal sources such as onboard sensors with which the GR 520 may be equipped.

Figure 6:
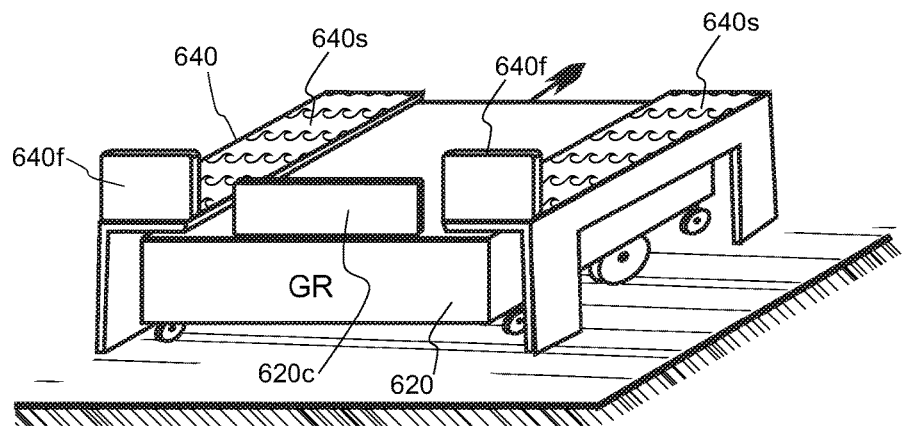
FIG. 6 illustrates in isometric view a ground robot in the moment of freely passing through a buffer unit, in an embodiment of both, according to the presently disclosed subject matter.

FIG. 6 illustrate in perspective view, the relationship between a Buffer Unit 640 and a GR 620 when the GR 620 is moving through the Buffer Unit 640. Buffer Unit 640 comprises Shoulders 640s on which a tote can be placed. Each Shoulder 640s has a Flap 640f which constitute a stopper for the tote, when the tote is unloaded from a GR 620 on the fly, as explained regarding FIG. 5b. The GR 620 is configured to freely move through the Buffer Unit 640 either in the direction indicated by the arrow or in the opposite direction. The GR 620 is equipped with a Collector 620c for pushing a tote to be uploaded from the Buffer Unit 640 onto the top of the GR 620. Collector 620c may push a tote from the top of the GR 620 onto the Shoulders 640s of the Buffer Unit 640, when the GR 620 is turned by 180 degrees for moving through the Buffer Unit 640 in a direction opposite to the direction indicated by the arrow.

In various embodiments according to the presently disclosed subject matter, the Flaps 640f and/or the Collector 620c are retractable. In some embodiments the flaps and/or the collector are retractable and are provided from both ends of the shoulders 640s and of the top of the GR 640, such that exchanging totes between buffer units and GRs may be performed regardless of the direction of motion of the GR through the buffer unit, by automatically making them protrude on the correct ends per a current transferring, while retracting them on the opposite ends.

The use of a stage as a buffer unit may be considered advantageous over the use of the first floor of shelving units as a buffer unit, due to the larger storage space resulting from the use of the stage, and from freeing the first floor of the shelving units for use as a storage location.

In various embodiments of the presently disclosed subject matter the buffer units and the GRs are mutually configured for tote transfer therebetween, on the fly, i.e. while the GR is in motion through the buffer unit. In such embodiments, once a tote of interest has been placed on the buffer unit by a LR, a GR may travel through the stage for dragging the tote of interest off the buffer unit, such that when the GR is exiting the buffer unit, the tote also exits the buffer unit on top of the GR itself. Likewise, when a GR is instructed to unload a tote onto the buffer unit, the GR carrying the tote of interest approaches the stage from the opposite side, and the tote is dragged by onto the buffer unit until stopped by stopper means of the buffer unit, while the GR continues its motion out of the buffer unit. In various embodiments according to the presently disclosed subject matter, the type of goods within a tote of interest, the type of maneuvering to be taken by a robotic carrier in real time, or the like, may be considered by the algorithms which determine the velocity of a GR and/or of a LR, for determining the motion velocity of the robot during a maneuvering. Accordingly, on-the-fly tote transfer may be performed by the GR with or without a change in its velocity, during a tote transfer maneuvering. For example, in case a tote of interest is empty, or accommodates packaged goods, the algorithm may allow the robot carrying it to move in higher velocity compared to its velocity in case the content of the tote includes goods in bulk.

In various embodiments according to the presently disclosed subject matter, totes may have a diagonal bottom, i.e. a bottom end of a tote is inclined with respect to the floor of the storage facility when a plane tangential to the tote from above, is oriented horizontally.

When a tote, having a bottom end inclined to a horizontal plane, is comoving with a GR through a buffer unit (on top of the GR), the tote is pushed (dragged) by the GR, into position on the buffer unit, while its inclined bottom in interaction with buffer unit upwardly facing surfaces, thus making the tote gradually gaining height with respect to the GR until fully departing from the GR and coming into rest on the buffer unit. In some exemplary embodiments, the GR may comprise a passive collector flap that is used to push the tote off the stage. Additionally, or alternatively, the stage may comprise two collector flaps (referred to herein also as 'tote stoppers') that are used to stop the tote, guaranteeing it remains on the Buffer Unit while the GR continues its motion exiting the buffer unit. In some exemplary embodiments, the two collector flaps have a gap in between, a size of which allows a GR's flap to pass through when the GR is heading through the buffer unit. The direction of motion of the GR through the Buffer Unit determines whether a tote is to be stopped by the flaps and remain in position on the Buffer Unit, or is to be pushed by the flap of the GR until removed from the Buffer Unit onto the GR.

In various embodiments according to the presently disclosed subject matter, a stage constituting a Buffer Unit, may be passive and located in the middle of an aisle, between Shelving Units. In some embodiments, the stage may comprise one or more slots through which a flap of a GR in motion may pass. The GR may comprise active flaps, that may be extended automatically. The GR may travel into a positioned below the stage. At that position, the active flaps may be raised for lifting the tote. The active flaps may penetrate the stage through the slots. Once the tote has been raised by the active flaps, the tote may be carried on by the GR. The GR may continue its traveling path from underneath the stage until exiting. The exit path may be configured to cooperate with the design of the slots so as to allow the active flaps to pass freely through the slots. After the GR is no longer below the stage, the active flaps may be retracted. The tote may thereafter be carried by a plate located on top of the GR.

Figure 7A:
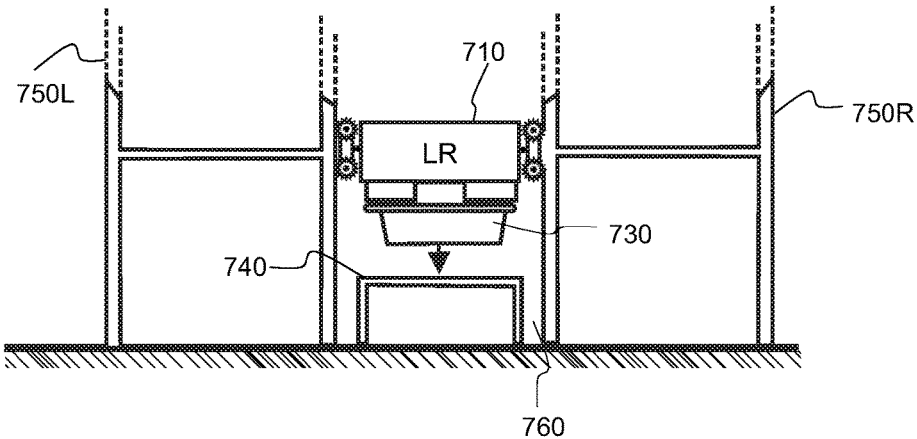
FIGS. 7a-7g illustrate in schematic side views, some steps in the process of transferring a tote of interest between locations in an embodiment of a storage facility according to the presently disclosed subject matter.
Figure 7B:
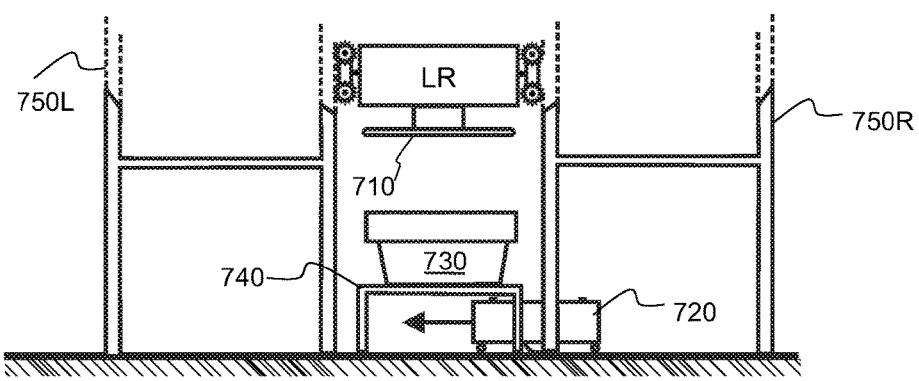
Figure 7C:
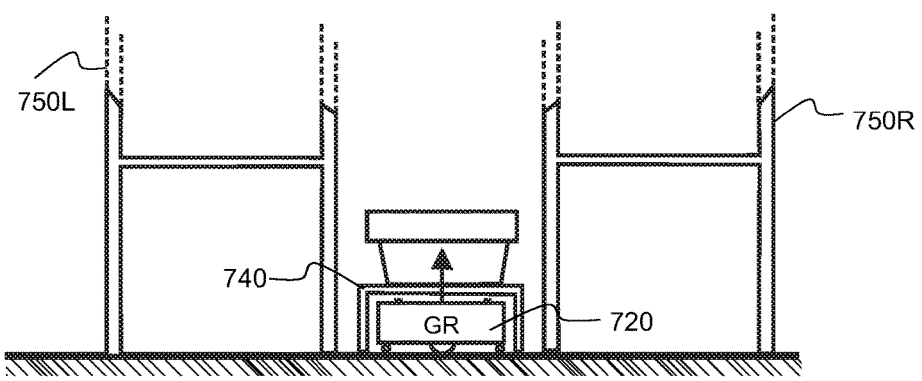
Figure 7D:
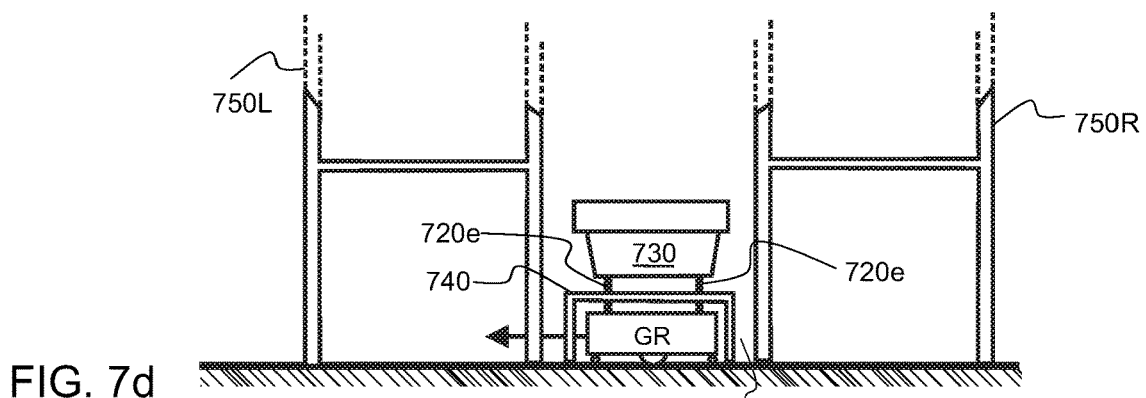
Figure 7E:
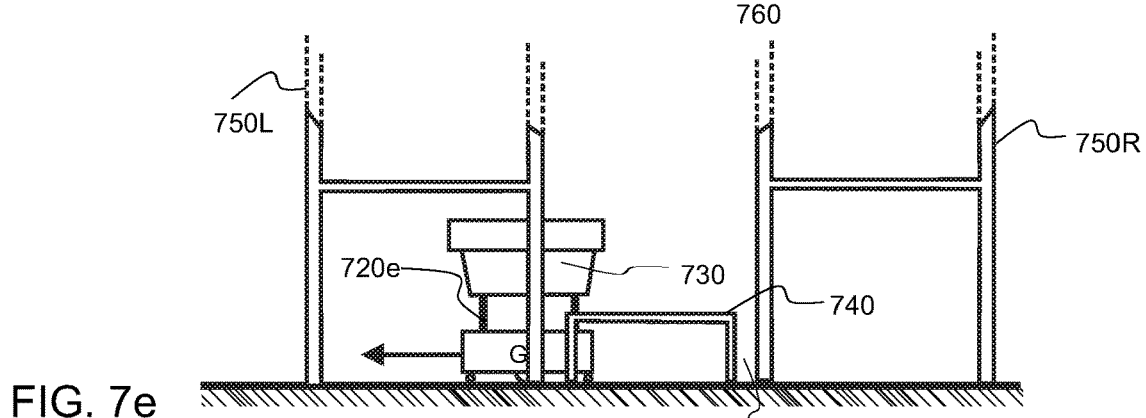
Figure 7F:
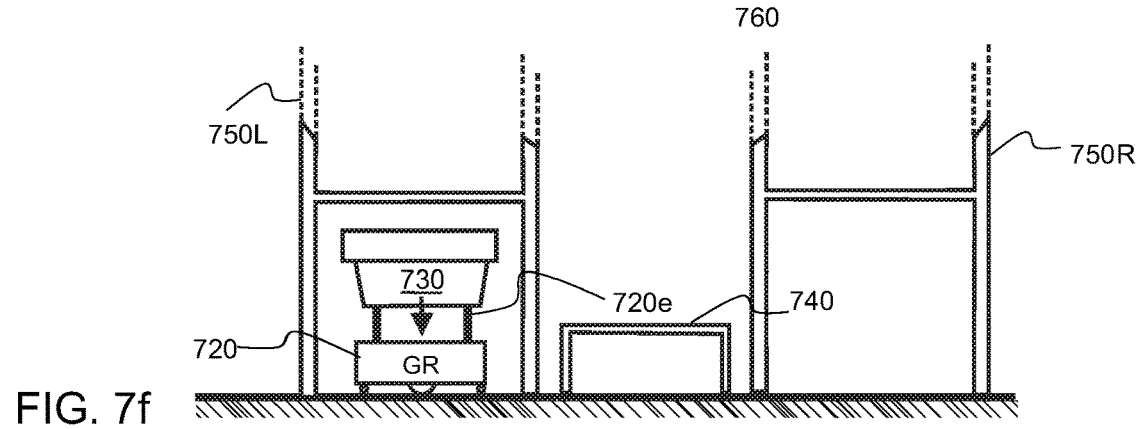
Figure 7G:
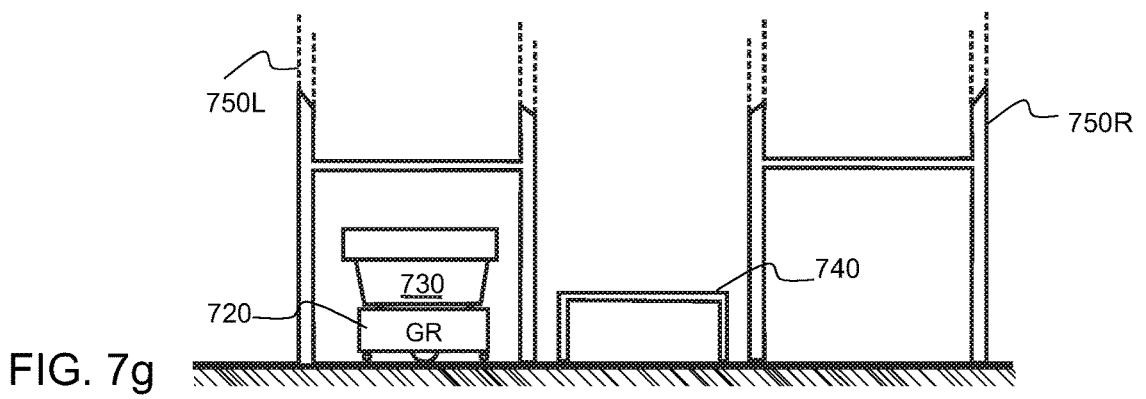

Referring now to FIGS. 7a-7g which illustrate steps taken in an embodiment according to the presently disclosed subject matter, for tote transferring. FIG. 7a illustrates a step in the process, in which an LR 710 places a tote of interest 730 on middle aisle stage 740 which constitutes a Buffer Unit according to the presently disclosed subject matter. FIG. 7b illustrates a next step in the process, in which a GR 720 is arriving at the stage for uploading the tote of interest 730, from the stage. FIG. 7c illustrates the GR 720 in position under the tote of interest. FIG. 7d illustrates the GR with short-action tote lifting arms 720E extending upwardly, lifting the tote off the top of the stage, thus enabling the GR to move to the left as indicated by the arrow, with the tote of interest carried by. FIG. 7e illustrates the GR during its motion toward the aisle exit route. FIG. 7f illustrates the GR starting to retract the arms of the tote lift mechanism 720E. In FIG. 7g the retraction of the lifting arms has been completed, the tote of interest seats safely on the top plate of the GR, and the GR may head on toward the destination of the tote of interest, e.g. a picking station.

Figure 8A:
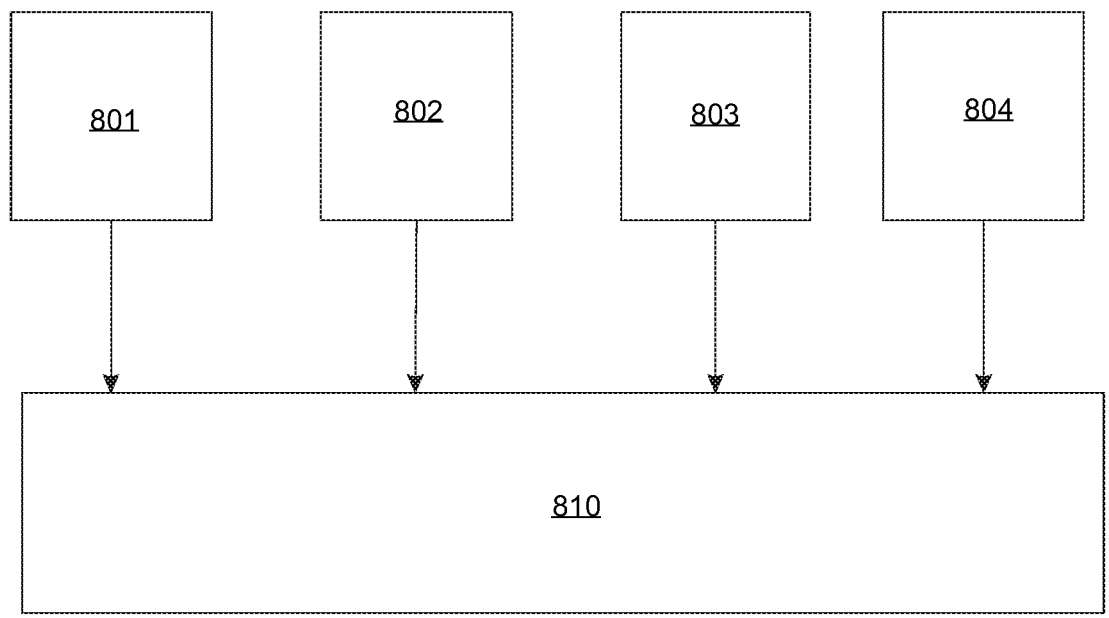
FIG. 8a-8b illustrates in a block diagrams the handling of a storage facility according to some embodiments the presently disclosed subject matter.

Referring now to FIG. 8a, the method for handling robotically operated deliveries of deliverables, between locations within a storage facility, is emphasized using a block diagram. Block 801 represents identifying a first plurality of robotic carriers as being capable of carrying deliverables between the plurality of storage levels. Block 802 represents identifying a second plurality of robotic carriers as being capable of carrying deliverables between low-level locations leveled no more than a predetermined height above the floor level, wherein storage locations within a predetermined number of storage levels from above the low-level locations, are beyond the reach of robotic carriers from said second plurality. Block 803 represents providing locations at which deliverables can be directly accessible by carriers of the second plurality. Blok 804 represents sorting and memorizing lists of deliverables ranked according to expected prevalence of participation of the deliverables in deliveries between locations directly accessible to carriers from the second plurality; and Block 810 represents utilizing said sorting for storing in the low-level locations, deliverables ranked as associated with high prevalence of participation in deliveries between locations directly accessible to robotic carriers from the second plurality.

Figure 8B:
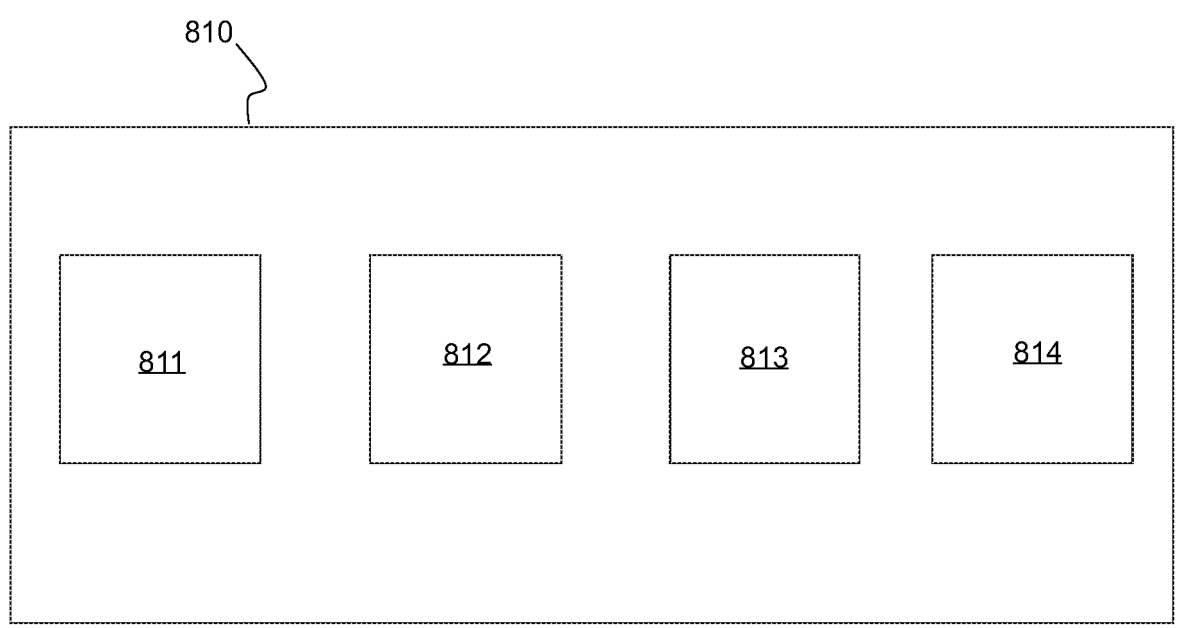
Figure 9:
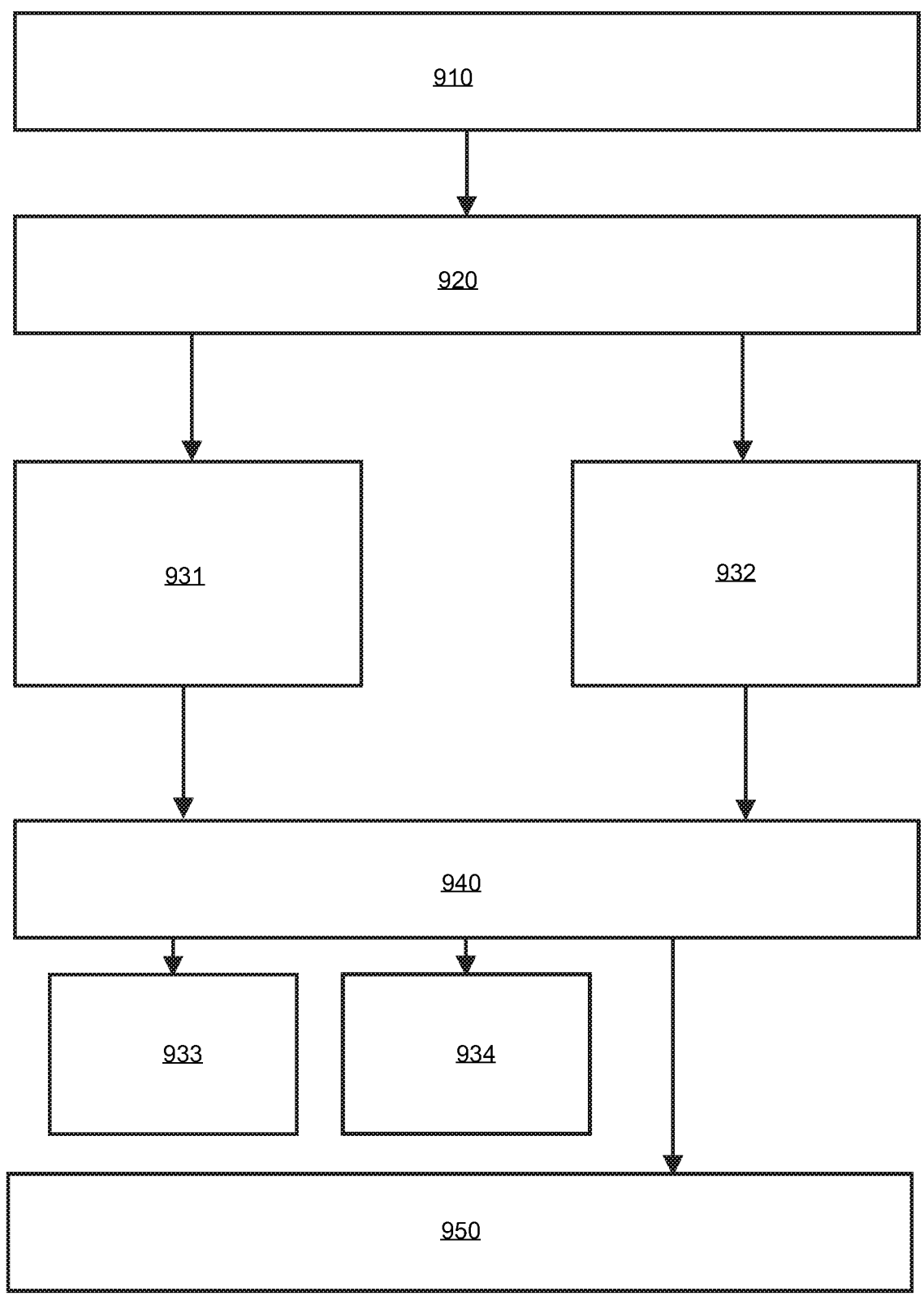
FIG. 9 illustrates a flowchart diagram of a portion of the method for handling of a storage facility according to some embodiments the disclosed subject matter.

Referring now to FIG. 8b, in various embodiments of the method according to the presently disclosed subject matter, the utilizing represented by Block 810 of FIG. 8a, may include a process represented by Block 811, which includes instructing a robotic carrier from the second plurality of robotic carriers to transfer a deliverable of interest from a deliverables-receiving-station directly to a storage location without intermediation of robotic carriers from the first plurality, whenever the deliverable of interest is ranked as associated with high prevalence of participation in deliveries between locations at the reach of robotic carriers from the second plurality, and there is a free storage location in the low-level locations, for receiving the deliverable of interest.

In various embodiments of the method according to the presently disclosed subject matter, the utilizing represented by Block 810 of FIG. 8a, may include a process represented by Block 812, which includes activating a robotic carrier from the first plurality of robotic carriers, to free a storage location located in the low-level locations, for receiving the deliverable of interest, said activating is based on said sorting in that a deliverable currently stored in a storage location to be freed is ranked as associated with lower prevalence of participation in deliveries between locations at the reach of robotic carriers from the second plurality, than a ranking of the deliverable of interest.

In various embodiments of the method according to the presently disclosed subject matter, the utilizing represented by Block 810 of FIG. 8a, may include a process represented by Block 813, which includes submitting robotic carriers from the first plurality of robotic carriers, during time durations at which there are no other missions to be fulfilled by, to missions involved with increasing the number of deliverables more highly ranked for their prevalence of participation in deliveries between locations directly accessible by robotic carriers from the second plurality, in said directly accessible locations.

In various embodiments of the method according to the presently disclosed subject matter, the utilizing represented by Block 810 of FIG. 8a, may include a process represented by Block 814, which includes utilization of a self-learning algorithm for updating the prevalence of participation in deliveries between locations directly accessible by GRs, per each deliverable and/or per each inventory item, based on actual participation of the deliverables, in deliveries between locations directly accessible to GRs.

Referring now to FIG. 8, showing a process of preparing and outputting a delivery of goods to a remote end-customer, based on an order placed by the end-customer.

Block 910 represents the control system of the warehouse identifying a predetermined number of totes to be transferred to a picking station for consolidating the order. Block 920 represents the control system of the warehouse preparing a plan for an efficient transferring of the totes from their current locations in the warehouse, to the picking station.

Block 931 represents the system instructing a GR to take a tote of first tote of interest from the totes identified in stage 910 of the process, directly from a current location accessible to the GR without intermediation of an LR, and to transfer the tote of interest to a specific picking station determined in stage 920 of the process.

Block 931 represents the system instructing an LR and a GR to cooperate in taking a second tote of interest from the totes identified in stage 910 of the process, from a current location accessible to the LR, and to transfer the tote of interest from the LR to the GR, e.g. through a buffer unit, to the specific picking station determined in stage 920 of the process. Process stages 931 and 932 may be repeated for as many totes as required according to stage 910 of the process, until all the totes identified are transferred to the picking station.

Block 940 represents the consolidation of the order into and order tote at the picking station. According to various embodiments of the presently disclosed subject matter, the consolidation may be performed automatically by a robotic system controlled by the control system and configured to pick items of interest from the totes, and to place them into an order tote. After a completion of picking items of interest from a tote, the tote is returned to a free storage location in the facility. The returning of the tote may be performed either by a GR alone, as represented by block 933 (to a location accessible to the GR), or by cooperation between a GR and a LR, as represented by block 934 (to a location in a shelving unit accessible to the LR only). Returning the totes, may or may not be reversal of the stages 931 and 932 of the process, depending on what is the prevalence of each specific tote of interest in participating in a next transfer to be carried by a GR alone.

Block 950 represents the outputting of a prepared tote to the remote end-customer.

It will be appreciated by persons skilled in the art that the present invention is not limited by what has been particularly shown and described hereinabove. Rather the scope of the invention also includes variations and modifications that would occur to persons skilled in the art upon reading the foregoing description and which are not in the prior art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A storage facility comprising:
   a plurality of shelving units each comprising a plurality of storage levels differing from one another by height from above a floor of the storage facility;
   a first plurality of robotic carriers configured to carry deliverables between the plurality of storage levels;
   a second plurality of robotic carriers configured to carry deliverables between low-level locations leveled no more than a predetermined height above the floor of the storage facility, wherein storage locations within a predetermined number of storage levels from above the low-level locations, are beyond the reach of robotic carriers from said second plurality;
   a picking station;
   a computerized mission planning center configured to control transfer of deliverables between locations in the storage facility, by the first plurality and the second plurality of the robotic-carriers;
   wherein robotic carriers of the first plurality are of simplified structure in that each robotic carrier from said first plurality is configured to carry deliverables situated on the robotic carrier from above on a horizontally maintained platform, the robotic carrier being thereby secured against unintentional dropping of the tote; and
   wherein the mission planning center is configured to provide for a transfer of a tote of interest from the top of a robotic carrier of the first plurality to a robotic carrier of the second plurality, or from a robotic carrier of the second plurality to the top of a robotic carrier of the first plurality, by first instructing a robotic carrier which already carries the tote of interest, to unload the tote onto an intermediating platform accessible to a robotic carrier of the second plurality, and upon unload approval, instructing a robotic carrier intended to receive the tote, to upload the tote of interest from the intermediating platform.

2. A storage facility according to claim 1, wherein the intermediating platform comprises at least one location for receiving a deliverable, each such location is provided with stoppers for stopping a deliverable from continuing to comove with a robotic carrier, when the robotic carrier maneuvers for unloading a deliverable of interest by moving through the intermediating platform.

3. A storage facility according to claim 1, wherein each robotic carrier of the second plurality comprises a tote dragging element configured to drag a tote of interest onto or from the intermediating platform when the robotic carrier maneuvers for unloading or uploading a deliverable of interest by moving through the intermediating platform.

4. A storage facility according to of claim 3, wherein the stoppers are retractable.

5. A storage facility according to of claim 4, wherein the dragging element is retractable.

6. A method for handling robotically operated deliveries of deliverables, between locations within a storage facility, the storage facility comprises a floor level, a plurality of storage levels differing in their respective height from above the floor level, the method comprising:
   identifying a first plurality of robotic carriers as being capable of carrying deliverables between the plurality of storage levels;
   identifying a second plurality of robotic carriers as being capable of carrying deliverables between low-level locations leveled no more than a predetermined height above the floor level, wherein storage locations within a predetermined number of storage levels from above the low-level locations, are beyond the reach of robotic carriers from said second plurality;

providing locations at which deliverables can be directly accessible by carriers of the second plurality;

sorting and memorizing lists of deliverables ranked according to expected prevalence of participation of the deliverables in deliveries between locations directly accessible to carriers from the second plurality; and utilizing said sorting for storing in the low-level locations, deliverables ranked as associated with high prevalence of participation in deliveries between locations directly accessible to robotic carriers from the second plurality.

7. The method according to claim 6, further comprising instructing a robotic carrier from the second plurality of robotic carriers to transfer a deliverable of interest from a deliverables-receiving-station directly to a storage location without intermediation of robotic carriers from the first plurality, whenever the deliverable of interest is ranked as associated with high prevalence of participation in deliveries between locations at the reach of robotic carriers from the second plurality, and there is a free storage location in the low-level locations, for receiving the deliverable of interest.

8. The method according to claim 7, further comprising activating a robotic carrier from the first plurality of robotic carriers, to free a storage location located in the low-level locations, for receiving the deliverable of interest, said activating is based on said sorting in that a deliverable currently stored in a storage location to be freed is ranked as associated with lower prevalence of participation in deliveries between locations at the reach of robotic carriers from the second plurality, than a ranking of the deliverable of interest.

9. The method according to claim 6, further comprising submitting robotic carriers from the first plurality of robotic carriers, during time durations at which there are no other missions to be fulfilled by, to missions involved with increasing the number of deliverables more highly ranked for their prevalence of participation in deliveries between locations directly accessible by robotic carriers from the second plurality, in said directly accessible locations.

10. The method according to claim 6, wherein the locations directly accessible by robotic carriers of the second plurality includes at least one of: (i) storage locations leveled no more than a predetermined height above the floor level and accessible by robotic carriers of the first plurality; (ii) storage locations leveled no more than a predetermined height above the floor level and inaccessible by robotic carriers of the first plurality; (iii) buffer stations accessible by robotic carriers of the first plurality; (iv) deliverables-receiving-station; and (v) deliverables-picking-station.

11. The method according to claim 6, further comprising provision of uniformly sized totes as the deliverables.

12. The method according to claim 11, further comprising arranging a plurality of different goods within a range of totes, said arranging includes sorting and memorizing lists of inventory items ranked according to expected prevalence of participation of the inventory items, respectively, in deliveries between locations directly accessible to carriers from the second plurality, wherein said arranging is based on said sorting, in that different inventory items within each specific tote from the range are ranked all within a respective predetermined ranking extent, differing to robotic carriers from the second plurality, is a function of a ranking of inventory items accommodated by each deliverable.

13. The method according to claim 6, further comprising utilizing a self-learning algorithm for updating the prevalence of participation per a deliverable, based on actual participation of the deliverables, in deliveries between locations directly accessible to carriers from the second plurality.

14. The method according to claim 13, further comprising utilizing a self-learning algorithm for updating the prevalence of participation per each inventory item, based on actual participation of the inventory item, in orders placed by customers.

15. The method according to claim 6, further comprising directing a robotic-carrier from the second plurality, to a location where it may become loaded with a deliverable of interest by removing the deliverable of interest from the location onto the robotic-carrier while the robotic-carrier is in motion.

16. The method according to claim 6, further comprising directing a robotic-carrier from the second plurality, to a location where it may become unloaded from a deliverable of interest by moving through the location without stopping.

* * * * *